United States Patent [19]

Yamagata

[11] Patent Number: 4,653,876

[45] Date of Patent: Mar. 31, 1987

[54] CLOSE-UP LENS SYSTEM

[75] Inventor: Masakazu Yamagata, Tokyo, Japan

[73] Assignee: Asahi Kogaku Kogyo Kabushiki Kaisha, Tokyo, Japan

[21] Appl. No.: 709,104

[22] Filed: Mar. 7, 1985

[30] Foreign Application Priority Data

Mar. 7, 1984 [JP] Japan .................. 59-44448

[51] Int. Cl.$^4$ .......................... G02B 9/62; G02B 9/64
[52] U.S. Cl. .................... 350/463; 350/428; 350/464
[58] Field of Search .................. 350/463, 464, 428

[56] References Cited

U.S. PATENT DOCUMENTS 3,784,285 1/1974 Watanabe et al. ............. 350/428 X
4,307,943 12/1981 Betensky et al. ................. 350/428

Primary Examiner—John K. Corbin
Assistant Examiner—Scott J. Sugarman
Attorney, Agent, or Firm—Finnegan, Henderson, Farabow, Garrett & Dunner

[57] ABSTRACT

Herein disclosed is a close-up photographic lens system comprising a first lens group disposed on the object side and having a positive refractive power and a second lens group disposed on the image side and having a negative refractive power. The first lens group is movable relative to the second lens group, thereby focusing the object from an infinite distance to a close-up distance with respect to the lens system. The lens system meets the following conditions.

(1) $0.69 < f_I/f < 0.86$
(2) $0.47 < f_{BI}/f < 0.81$
(3) $0.88 < S_{I(-1)}/S_{(-1)} < 1.13$
(4) $0.30 < P_I < 0.69$ where $f_I$ is the focal length of the first lens group $L_I$, f is the focal length of the overall lens system at the infinite photographing position, $f_{BI}$ is the backfocus of the first lens group $L_I$ at the infinite photographing position, $S_{I(-1)}$ is the spherical Seidel coefficient of third order of the first lens group $L_I$ at the unity magnification photographing position, $S_{(-1)}$ is the spherical Seidel coefficient of third order of the overall lens system at the unity magnification photographing position, and $P_I$ is the Petzval's sum of the first lens group $L_I$.

5 Claims, 12 Drawing Figures

CLOSE-UP LENS SYSTEM

BACKGROUND OF THE INVENTION

The present invention relates to a close-up, macro-or micro-photographic lens system, and it relates more specifically to a lens system having an F-number of about 1:2.8 and a view angle of about 24.5°, in which various aberrations are well compensated for from an infinite distance photographic position to a short distance photographic position of unity magnification.

Conventionally, there have been provided lenses for use in short distance photographing, which are so called "micro- or macro-lenses". Since such lenses are inherently designed so that an image forming performance becomes best in the short distance photographing condition, the aberration compensation in the infinite distance photographing condition is unsatisfactory in comparison with other general lenses. Also a lens having a floating function is well known for the purpose of correcting change in aberration due to the change of the photographic distance.

Although some lenses of such type having the floating function have a higher brightness with an F-number being about 1:2.8, a focal length thereof is relatively short and a maximum magnification of the lens system per se is about 0.5 times. Therefore, if a unity magnification photographing is desired, it is necessary to use an adaptor such as a close-up ring. Also, in case of lenses having no floating function, it is impossible to increase a brightness, that is, an F-number thereof is about 1:3.5 to 1:4; and the maximum magnification would fall in the range of 0.25 to 0.5 times.

SUMMARY OF THE INVENTION

An object of the present invention is to provide a bright lens system having a view angle of about 24.5° and an F-number of about 2.8 whereby it is possible to photograph an object from an infinite distance to a closeup distance of unity magnification without any other adaptor means, and various aberrations are well compensated for over all the photographing range.

DETAILED DESCRIPTION OF THE EMBODIMENTS

Figure 1:
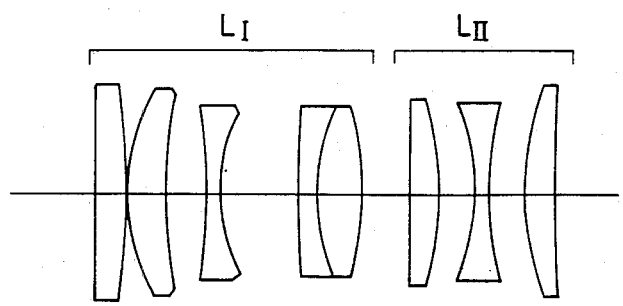
FIGS. 1, 4, 7 and 10 are views showing structural arrangements of lens systems in accordance with first through fourth examples of the present invention.

The present invention will now be described with reference to the drawings. A lens system according to the present invention is composed of a first lens group $L_I$ having a positive refractive power and positioned toward the object and a second lens group $L_{II}$ having a negative regractive power and positioned toward the image. The first lens group $L_I$ is moved relative to the second lens group $L_{II}$ thereby performing a focusing from an infinite distance to a unity magnification distance. The lens system meets the following conditions:

(1) $0.69 < f_I/f < 0.86$
(2) $0.47 < f_{BI}/f < 0.81$
(3) $0.88 < S_{I(-1)}/S_{(-1)} < 1.13$
(4) $0.30 < P_I < 0.69$ where $f_I$ is the focal length of the first lens group $L_I$, f is the focal length of the overall lens system at the infinite photographing position, $f_{BI}$ is the backfocus of the first lens group $L_I$ at the infinite photographing position, $S_{I(-1)}$ is the spherical Seidel coefficient of third order of the first lens group $L_I$ at the unity magnification photographing position, $S_{(-1)}$ is the spherical Seidel coefficient of third order of the overall lens system at the unity magnification photographing position, and $P_I$ is the Petzval's sum of the first lens group $L_I$.

As is apparent from the above, in accordance with the present invention, the forward movement of the first lens group is made about half the movement of the overall lens moving system. Therefore, a lens barrel structure may be made relatively small in size. This is advantageous in structure design.

The above-specified conditions will now be explained in more detail.

The condition (1) represents a range of a focal length of the first lens group $L_I$ having the positive focal length and is required for constituting a lens system having an F-number of about 1:2.8 and a view angle of about 24.5° to which the present invention pertaines. When the lower limit of the condition (1) were exceeded, the forward movement of the first lens group $L_I$ would be short but the negative refractive power of the second lens group $L_{II}$ would be too excessive. As a result, a Petzval's sum would be difficult to compensate for a field of curvature to provide an unsatisfactory image forming performance. Inversely, when the upper limit were exceeded, it would be easy to correct various aberrations but the forward movement would be substantially the same as that in a conventional overall system forwarding system, which would not lead to attain the object of the present invention.

The condition (2) represents a range of a backfocus of the first lens group $L_I$ and is related to a physical size of the overall lens system. When the lower limit of the condition (2) were exceeded, the length of the overall lens system would be increased but the backfocus of the overall lens system would be decreased. It would be not available to mount the lens system to a camera body. Inversely, when the upper limit were exceeded, it would be available to correct various aberrations but the length of the overall lens system would be too long to make the lens system . compact. Thus, although the forward movement of the first lens group $L_I$ would be short, such result would not be advantageous in designing the structure for a lens barrel.

The condition (3) defined a ratio of a third order Seidel spherical coefficient of the first lens group $L_I$ to the third order Seidel spherical coefficient of the overall lens system at the close-up photographing condition (i.e., unity photographing condition). The condition (3) shows a range where the compensation of various aberration may readily be attained in the unity photographing condition. When the lower limit of the condition (3) were exceeded, the spherical aberration generated in the first lens group $L_I$ would be overcorrected, whereas when the upper limit were exceeded, the spherical aberration would be undercorrected. However, in any case, if the condition (3) would not be met, it is very difficult to suitably compensate for the spherical aberration, generated in the first lens group $L_I$, with the second lens group $L_{II}$. In this case, it would be impossible to obtain a desired image focusing performance.

The condition (4) defines a range of the Petzval's sum of the first lens group $L_I$ in the infinite distance photographing condition and is important to correcting a field of curvature and an astigmatism. In order to keep the focusing performance desired, it is preferable to make the Petzval's sum of the overall lens system approximately 0.02 to 0.13 in accordance with the present invention. However, since the second lens group $L_{II}$ of the lens system in accordance with the present invention has the negative refractive power, the Petzval's sum of the overall lens system tends to be very small or negative. Therefore, in order to keep the Petzval's sum of the overall lens system at a desired value, the condition (4) is required. When the lower limit of the condition (4) were exceeded, it would be impossible to keep the Petzval's sum at a desired value, and in particular, the image focusing performance at a marginal portion of the picture image would deteriorate so that a desired view angle might not be kept. Inversely, when the upper limit were exceeded, the sum of Petzval would be too large to thereby increase the field of curvature so that it would be difficult to compensate for astigmatism and a focusing performance at an intermediate portion of the picture image would deteriorate. This result is not desirable.

The following are the specific numerical embodiments in accordance with the present invention, where f, $F_{NO}$, ω and $f_B$ are the overall focal length, the F-number, half the view angle and the backfocus, r is the radius of curvature of each lens surface, d is the thickness or air space of the each lense, $n_d$ is the refractive index at d-line of each lens, and $ν_d$ is the Abbe number of each lens at d-line. In the drawing, $F_{NO}$ represents the F-number in the unity magnification photographing condition, and Y represents the image height.

EXAMPLE 1

| | No. | r | d | $n_d$ | $ν_d$ |
|---|---|---|---|---|---|
| | | f = 100  $F_{NO}$ 1:2.8  2ω = 24.6°  $f_B$ = 37.9 | | | | |
| $L_I$ | 1 | ∞ | 5.00 | 1.80610 | 40.9 |
| | 2 | −131.030 | 0.10 | | |
| | 3 | 32.996 | 6.74 | 1.69100 | 54.8 |
| | 4 | 102.824 | 6.66 | | |
| | 5 | −99.320 | 2.00 | 1.69895 | 30.1 |
| | 6 | 30.282 | 13.20 | | |
| | 7 | 189.195 | 3.00 | 1.59270 | 35.3 |
| | 8 | 37.149 | 7.80 | 1.67003 | 47.3 |
| | 9 | −46.681 | 7.85 → | 64.46 | |
| $L_{II}$ | 10 | 2379.272 | 5.00 | 1.63930 | 44.9 |
| | 11 | −50.723 | 6.02 | | |
| | 12 | −39.034 | 2.30 | 1.79952 | 42.2 |
| | 13 | 60.801 | 5.93 | | |
| | 14 | 48.573 | 5.13 | 1.59270 | 35.3 |
| | 15 | 382.221 | | | |

EXAMPLE 2

| | No. | r | d | $n_d$ | $ν_d$ |
|---|---|---|---|---|---|
| | | f = 100  $F_{NO}$ 1:2.8  2ω = 24.4°  $f_B$ = 37.5 | | | | |
| | 1 | 86.526 | 4.07 | 1.78590 | 44.2 |
| | 2 | −4267.522 | 0.10 | | |
| | 3 | 36.830 | 7.65 | 1.78800 | 47.4 |
| | 4 | 66.795 | 2.33 | | |
| | 5 | 141.154 | 4.06 | 1.76182 | 26.6 |
| $L_I$ | 6 | 30.113 | 16.01 | | |
| | 7 | −30.320 | 2.24 | 1.76180 | 27.1 |
| | 8 | −70.372 | 8.64 | 1.81554 | 44.4 |
| | 9 | −40.206 | 0.10 | | |
| | 10 | 171.267 | 5.09 | 1.77250 | 49.7 |
| | 11 | −92.122 | 2.03 → | 66.12 | |
| | 12 | −115.406 | 6.13 | 1.80518 | 25.4 |
| | 13 | −64.414 | 14.08 | | |
| $L_{II}$ | 14 | −43.997 | 2.45 | 1.85026 | 32.3 |
| | 15 | 114.325 | 1.55 | | |
| | 16 | 85.374 | 7.63 | 1.64769 | 33.8 |
| | 17 | −103.353 | | | |

EXAMPLE 3

| | No. | r | d | $n_d$ | $ν_d$ |
|---|---|---|---|---|---|
| | | f = 100  $F_{NO}$ 1:2.8  2ω = 24.6°  $f_B$ = 73.9 | | | | |
| | 1 | 61.196 | 6.91 | 1.80610 | 40.9 |
| | 2 | −444.535 | 7.32 | | |
| | 3 | −47.433 | 1.60 | 1.67270 | 32.1 |
| | 4 | 89.032 | 6.92 | | |
| $L_I$ | 5 | −46.583 | 2.00 | 1.72151 | 29.2 |
| | 6 | 332.205 | 7.52 | 1.77250 | 49.7 |
| | 7 | −40.240 | 0.10 | | |
| | 8 | 364.823 | 5.61 | 1.78590 | 44.2 |
| | 9 | −87.502 | 2.50 → | 70.00 | |
| | 10 | −96.890 | 4.50 | 1.78300 | 36.1 |
| $L_{II}$ | 11 | −57.492 | 8.46 | | |
| | 12 | −47.870 | 3.00 | 1.63930 | 44.9 |
| | 13 | −157.202 | | | |

EXAMPLE 4

| | No. | r | d | $n_d$ | $ν_d$ |
|---|---|---|---|---|---|
| | | f = 100  $F_{NO}$ 1:2.8  2ω = 24.6°  $f_B$ = 37.6 | | | | |
| | 1 | 48.983 | 3.88 | 1.78590 | 44.2 |
| | 2 | 86.700 | 0.20 | | |
| | 3 | 30.134 | 6.76 | 1.62299 | 58.1 |
| $L_I$ | 4 | 99.340 | 4.43 | | |
| | 5 | −413.302 | 3.70 | 1.76182 | 26.6 |
| | 6 | 27.000 | 11.40 | | |
| | 7 | 80.080 | 4.67 | 1.76200 | 40.1 |
| | 8 | −80.080 | 4.00 → | 57.33 | |
| | 9 | −42.520 | 3.57 | 1.76182 | 26.6 |
| | 10 | −34.820 | 13.61 | | |
| $L_{II}$ | 11 | −30.398 | 1.92 | 1.72342 | 37.9 |
| | 12 | 234.000 | 0.20 | | |
| | 13 | 79.392 | 4.65 | 1.60342 | 38.0 |
| | 14 | −125.054 | | | |

The calculated values on the basis of the respective conditions in accordance with the respective examples are shown as below.

| Examples | 1 | 2 | 3 | 4 |
|---|---|---|---|---|
| $f_I/f$ | 0.752 | 0.801 | 0.822 | 0.730 |
| $f_{BI}/f$ | 0.550 | 0.563 | 0.771 | 0.501 |
| $S_{I(-1)}/S_{(-1)}$ | 0.938 | 0.935 | 1.015 | 1.000 |
| $P_I$ | 0.543 | 0.321 | 0.342 | 0.653 |

Figure 2:
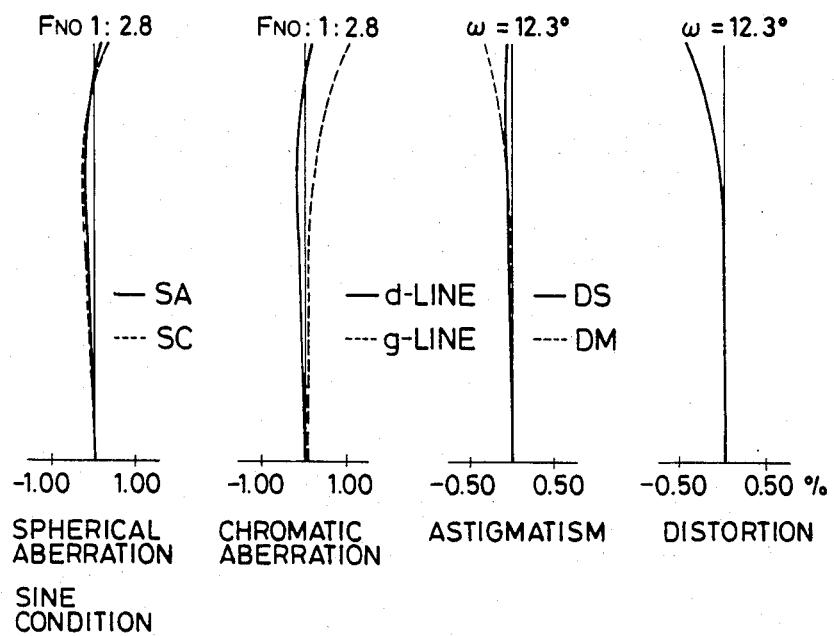
FIGS. 2, 5, 8 and 11 are graphs showing aberration curves in the infinite distance photographing condition in accordance with the first through fourth examples.
Figure 3:
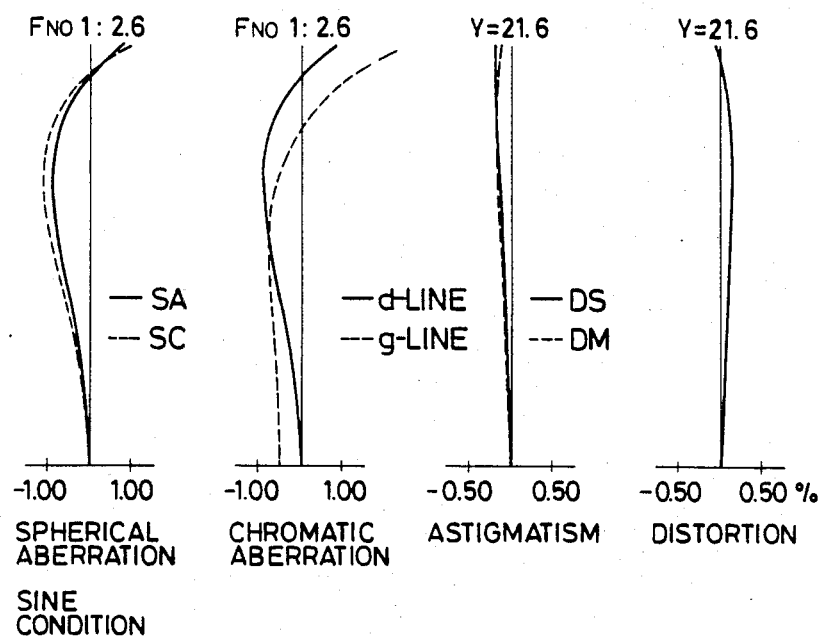
FIGS. 3, 6, 9 and 12 are graphs showing aberration curves in the unity magnification photographing condition in accordance with the first through fourth examples.

In the first example, the first lens group $L_I$ is moved toward the object by 56.61 to thereby provide a unity magnification photographing. The structural arrangement of the lens system in accordance with the first example is shown in FIG. 1 in the infinite distance photographing condition, with the aberration curves thereof being shown in FIG. 2 and with the other aberration curves in the unity magnification photographing condition being shown in FIG. 3.

Figure 4:
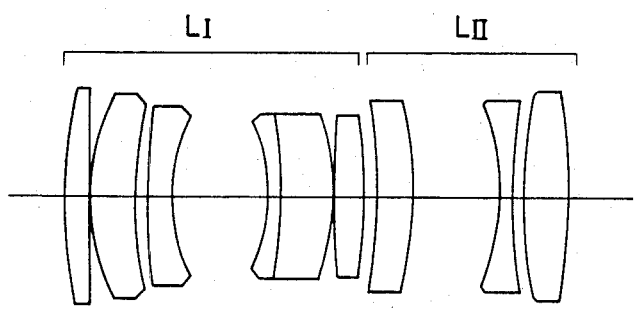
Figure 5:
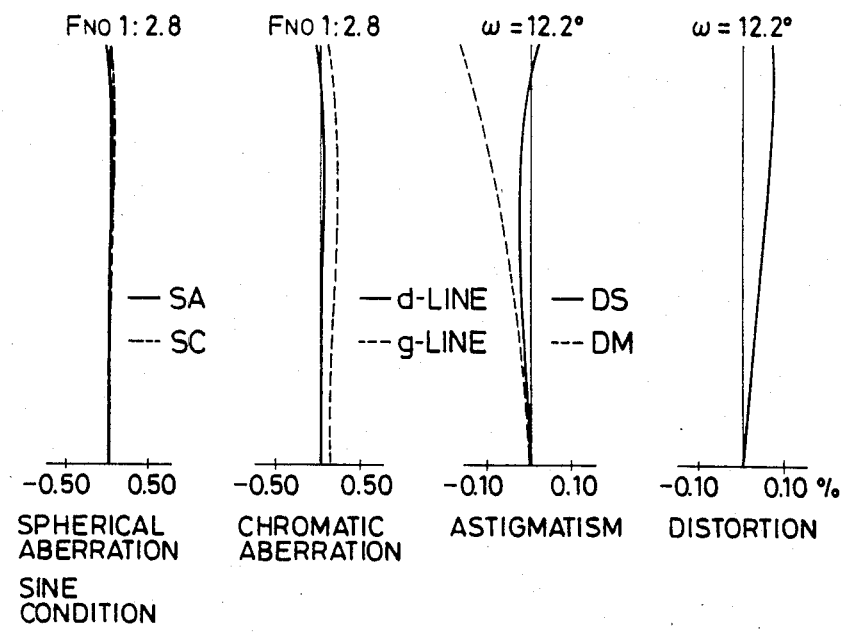
Figure 6:
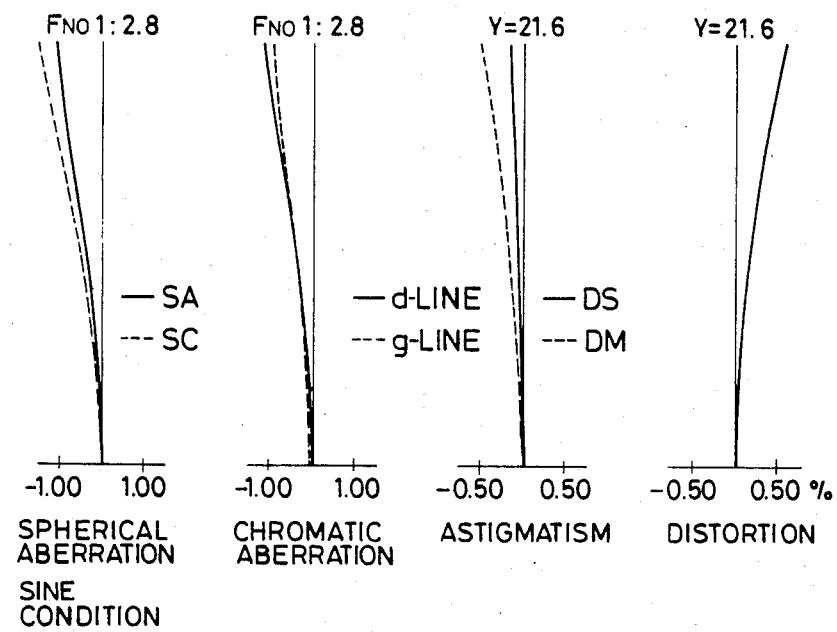

In the second example, the first lens gorup $L_I$ is moved toward the object by 64.09 to thereby provide a unity magnification photographing. The structural arrangement of the lens system in accordance with the second example is shown in FIG. 4 in the infinite distance photographing condition, with the aberration curves thereof being shown in FIG. 5 and with the other aberration curves in the unity magnification photographing condition being shown in FIG. 6.

Figure 7:
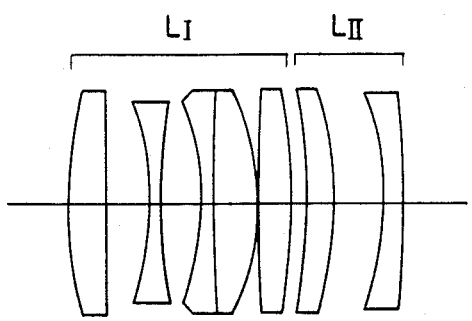
Figure 8:
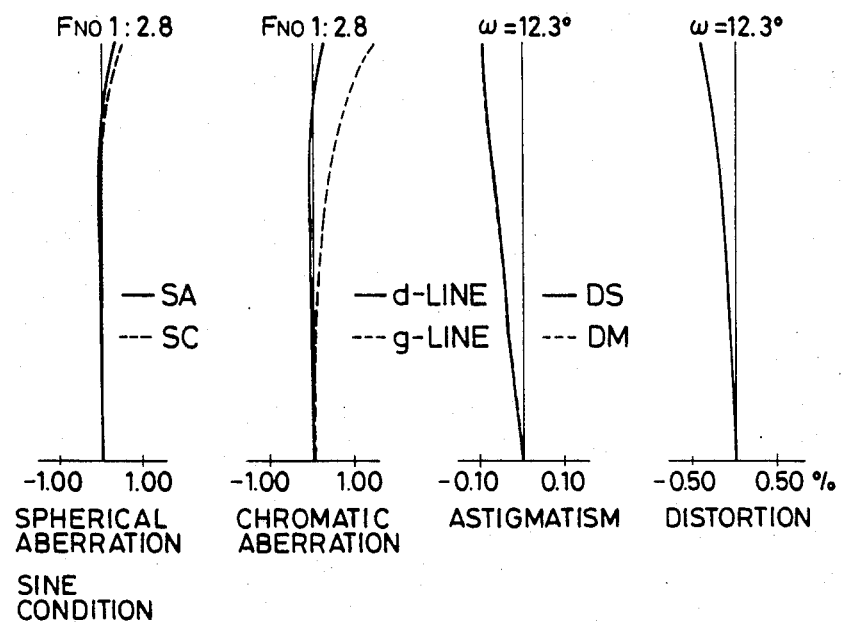
Figure 9:
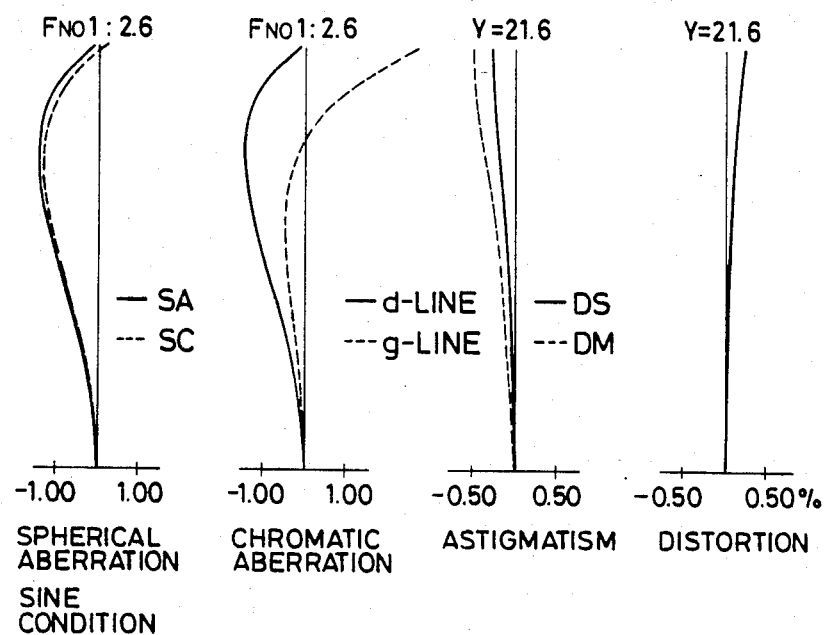

In the third example, the first lens group $L_I$ is moved toward the object by 67.50 to thereby provide a unity magnification photographing. The structural arrangement of the lens system in accordance with the third example is shown in FIG. 7 in the infinite distance photographing condition, with the aberration curves thereof being shown in FIG. 8 and with the other aberration curves in the unity magnification photographing condition being shown in FIG. 9.

Figure 10:
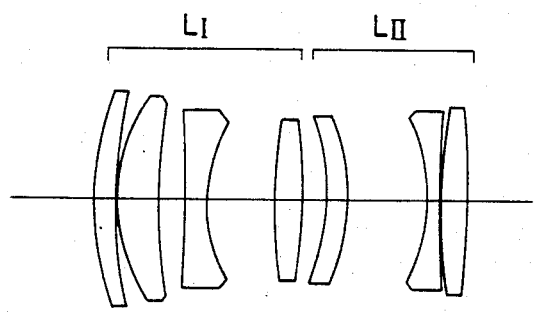
Figure 11:
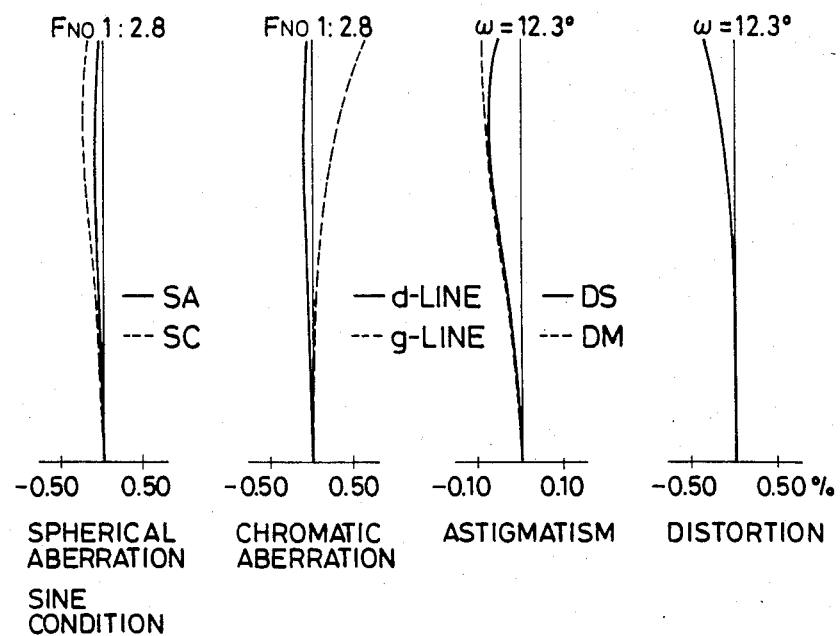
Figure 12:
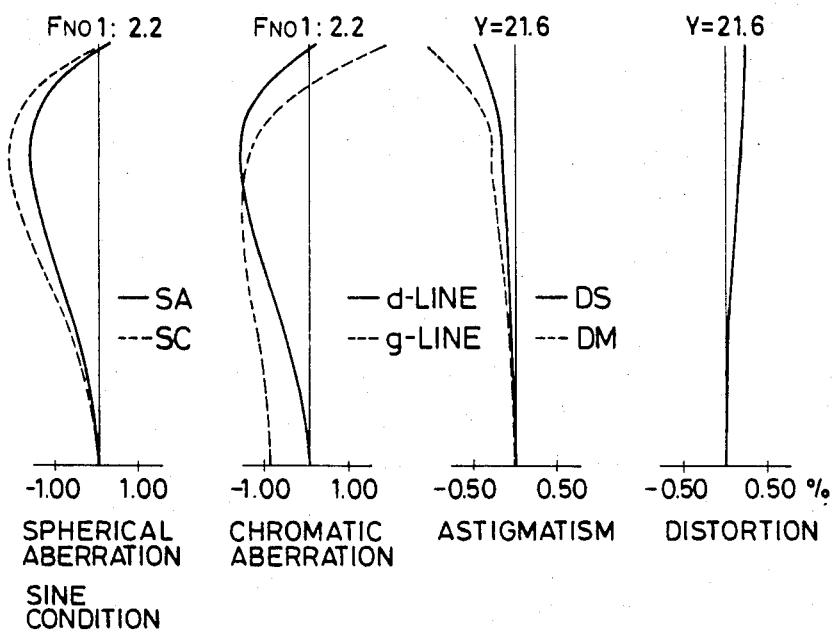

In the fourth example, the first lens group $L_I$ is moved toward the object by 53.33 to thereby provide a unity magnification photographing. The structural arrangement of the lens system in accordance with the fourth example is shown in FIG. 10 in the infinite distance photographing condition, with the aberration curves thereof being shown in FIG. 11 and with the other aberration curves in the unity magnification photographing condition being shown in FIG. 12.

What is claimed is:

1. A close-up photographic lens system comprising a first lens group disposed on the object side and having a positive refractive power and a second lens group disposed on the image side and having a negative refractive power, said first lens group being movable relative to said second lens group, thereby focusing the object from an infinite distance to a close-up distance with respect to said lens system, said lens system meeting the following conditions:

(1) $0.69 < f_I/f < 0.86$
(2) $0.47 < f_{BI}/f < 0.81$
(3) $0.88 < S_{I(-1)}/S_{(-1)} < 1.13$
(4) $0.30 < P_I < 0.69$ where $f_I$ is the focal length of the first lens group $L_I$, f is the focal length of the overall lens system at the infinite photographing position, $f_{BI}$ is the backfocus of the first lens group $L_I$ at the infinite photographing position, $S_{I(-1)}$ is the spherical Seidel coefficient of third order of the first lens group $L_I$ at the unity magnification photographing position, $S_{(-1)}$ is the spherical Seidel coefficient of third order of the overall lens system at the unity magnification photographing position, and $P_I$ is the Petzval's sum of the first lens group $L_I$.

2. The lens system of claim 1 further meeting the following numerical chart:

| | | f = 100 | $F_{NO}$ 1:2.8 | 2ω = 24.6° | $f_B$ = 37.9 | |
|---|---|---|---|---|---|---|
| | No. | r | d | | $n_d$ | $v_d$ |
| $L_I$ | 1 | ∞ | 5.00 | | 1.80610 | 40.9 |
| | 2 | −131.030 | 0.10 | | | |
| | 3 | 32.996 | 6.74 | | 1.69100 | 54.8 |
| | 4 | 102.824 | 6.66 | | | |
| | 5 | −99.320 | 2.00 | | 1.69895 | 30.1 |
| | 6 | 30.282 | 13.20 | | | |
| | 7 | 189.195 | 3.00 | | 1.59270 | 35.3 |
| | 8 | 37.149 | 7.80 | | 1.67003 | 47.3 |
| | 9 | −46.681 | 7.85 | → | 64.46 | |

-continued

| | | f = 100 | $F_{NO}$ 1:2.8 | 2ω = 24.6° | $f_B$ = 37.9 | |
|---|---|---|---|---|---|---|
| | No. | r | d | | $n_d$ | $v_d$ |
| $L_{II}$ | 10 | 2379.272 | 5.00 | | 1.63930 | 44.9 |
| | 11 | −50.723 | 6.02 | | | |
| | 12 | −39.034 | 2.30 | | 1.79952 | 42.2 |
| | 13 | 60.801 | 5.93 | | | |
| | 14 | 48.573 | 5.13 | | 1.59270 | 35.3 |
| | 15 | 382.221 | | | | | where f, $f_{NO}$, ω and $f_B$ are the overall focal length, the F-number, half the view angle and the backfocus, r is the radius of curvature of each lens surface, d is the thickness or air space of the respective lenses, $n_d$ is the refractive index at d-line of each lens, and $v_d$ is the Abbe number of each lens at d-line.

3. The lens system of claim 1 further meeting the following numerical chart:

| | | f = 100 | $F_{NO}$ 1:2.8 | 2ω = 24.4° | $f_B$ = 37.5 | |
|---|---|---|---|---|---|---|
| | No. | r | d | | $n_d$ | $v_d$ |
| $L_I$ | 1 | 86.526 | 4.07 | | 1.78590 | 44.2 |
| | 2 | −4267.522 | 0.10 | | | |
| | 3 | 36.830 | 7.65 | | 1.78800 | 47.4 |
| | 4 | 66.795 | 2.33 | | | |
| | 5 | 141.154 | 4.06 | | 1.76182 | 26.6 |
| | 6 | 30.113 | 16.01 | | | |
| | 7 | −30.320 | 2.24 | | 1.76180 | 27.1 |
| | 8 | −70.372 | 8.64 | | 1.81554 | 44.4 |
| | 9 | −40.206 | 0.10 | | | |
| | 10 | 171.267 | 5.09 | | 1.77250 | 49.7 |
| | 11 | −92.122 | 2.03 | → | 66.12 | |
| $L_{II}$ | 12 | −115.406 | 6.13 | | 1.80518 | 25.4 |
| | 13 | −64.414 | 14.08 | | | |
| | 14 | −43.997 | 2.45 | | 1.85026 | 32.3 |
| | 15 | 114.325 | 1.55 | | | |
| | 16 | 85.374 | 7.63 | | 1.64769 | 33.8 |
| | 17 | −103.353 | | | | | where f, $f_{NO}$, ω and $f_B$ are the overall focal length, the F-number, half the view angle and the backfocus, r is the radius of curvature of each lens surface, d is the thickness or air space of the respective lenses, $n_d$ is the refractive index at d-line of each lens, and $v_d$ is the Abbe number of each lens at d-line.

4. The lens system of claim 1 further meeting the following numerical chart:

| | | f = 100 | $F_{NO}$ 1:2.8 | 2ω = 24.6° | $f_B$ = 73.9 | |
|---|---|---|---|---|---|---|
| | No. | r | d | | $n_d$ | $v_d$ |
| $L_I$ | 1 | 61.196 | 6.91 | | 1.80610 | 40.9 |
| | 2 | −444.535 | 7.32 | | | |
| | 3 | −47.433 | 1.60 | | 1.67270 | 32.1 |
| | 4 | 89.032 | 6.92 | | | |
| | 5 | −46.583 | 2.00 | | 1.72151 | 29.2 |
| | 6 | 332.205 | 7.52 | | 1.77250 | 49.7 |
| | 7 | −40.240 | 0.10 | | | |
| | 8 | 364.823 | 5.61 | | 1.78590 | 44.2 |
| | 9 | −87.502 | 2.50 | → | 70.00 | |
| $L_{II}$ | 10 | −96.890 | 4.50 | | 1.78300 | 36.1 |
| | 11 | −57.492 | 8.46 | | | |
| | 12 | −47.870 | 3.00 | | 1.63930 | 44.9 |
| | 13 | −157.202 | | | | | where f, $f_{NO}$, ω and $f_B$ are the overall focal length, the F-number, half the view angle and the backfocus, r is the radius of curvature of each lens surface, $n_d$ is the thickness or air space of the respective lenses, $n_d$ is the refractive index at d-line of each lens, and $v_d$ is the Abbe number of each lens at d-line.

5. The lens system of claim 1 further meeting the following numerical chart:

| | | f = 100 | $F_{NO}$ 1:2.8 | $2\omega = 24.6°$ | $f_B = 37.6$ | |
|---|---|---|---|---|---|---|
| | No. | r | d | | $n_d$ | $\nu_d$ |
| | 1 | 48.983 | 3.88 | | 1.78590 | 44.2 |
| | 2 | 86.700 | 0.20 | | | |
| | 3 | 30.134 | 6.76 | | 1.62299 | 58.1 |
| $L_I$ | 4 | 99.340 | 4.43 | | | |
| | 5 | −413.302 | 3.70 | | 1.76182 | 26.6 |
| | 6 | 27.000 | 11.40 | | | |
| | 7 | 80.080 | 4.67 | | 1.76200 | 40.1 |
| | 8 | −80.080 | 4.00 | | | 57.33 |
| | 9 | −42.520 | 3.57 | | 1.76182 | 26.6 |
| | 10 | −34.820 | 13.61 | | | |
| $L_{II}$ | 11 | −30.398 | 1.92 | | 1.72342 | 37.9 |
| | 12 | 234.000 | 0.20 | | | |
| | 13 | 79.392 | 4.65 | | 1.60342 | 38.0 |
| | 14 | −125.054 | | | | | where f, $f_{NO}$, $\omega$ and $f_B$ are the overall focal length, the F-number, half the view angle and the backfocus, r is the radius of curvature of each lens surface, d is the thickness or air space of the respective lenses, $n_d$ is the refractive index at d-line of each lens, and $\nu_d$ is the Abbe number of each lens at d-line.

* * * * *